April 11, 1961 M. B. KIRKPATRICK Re. 24,965

MINING MACHINE

Original Filed Aug. 8, 1955 8 Sheets-Sheet 1

Inventor
Max B. Kirkpatrick
By Reynolds Beach & Christensen
Attorney

MINING MACHINE

Original Filed Aug. 8, 1955 8 Sheets-Sheet 2

Inventor
MAX B. KIRKPATRICK
By Reynolds, Beach & Christensen
Attorneys

April 11, 1961 M. B. KIRKPATRICK Re. 24,965

MINING MACHINE

Original Filed Aug. 8, 1955 8 Sheets-Sheet 3

Inventor
MAX B. KIRKPATRICK

By Reynolds, Beach & Christensen

Attorneys

April 11, 1961 M. B. KIRKPATRICK Re. 24,965
MINING MACHINE
Original Filed Aug. 8, 1955 8 Sheets-Sheet 4
Fig. 4a
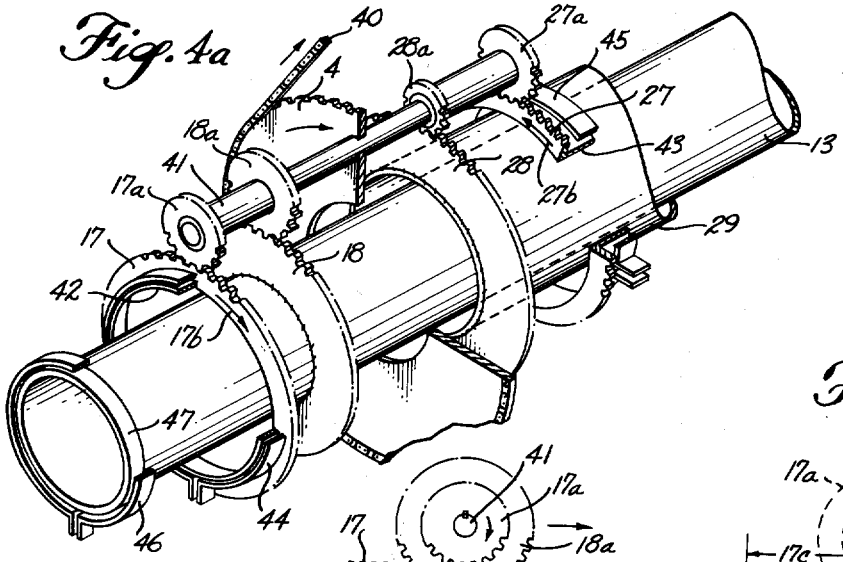
Fig. 4b
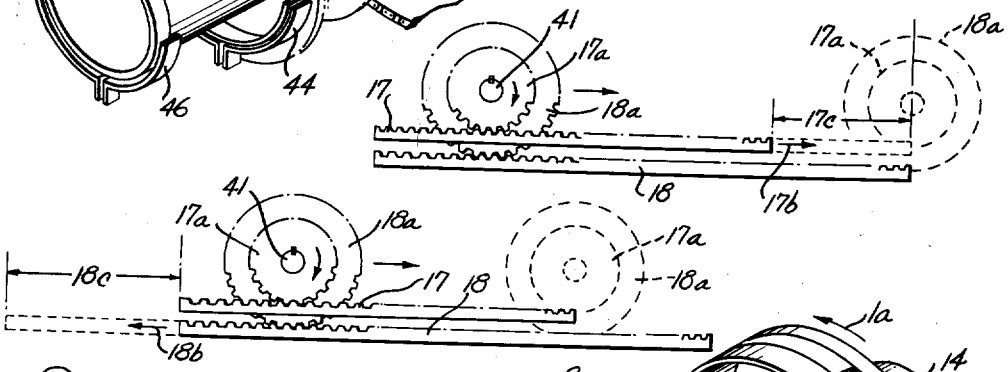
Fig. 5b
Fig. 5a
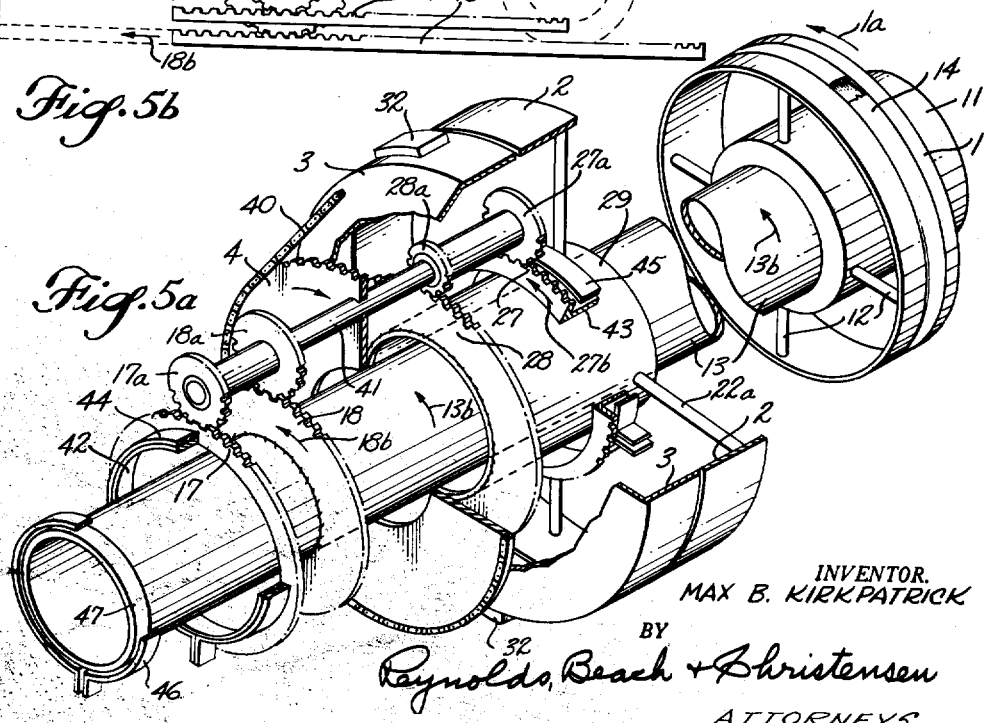
INVENTOR.
MAX B. KIRKPATRICK
BY
Reynolds, Beach & Christensen
ATTORNEYS April 11, 1961 M. B. KIRKPATRICK Re. 24,965

MINING MACHINE

Original Filed Aug. 8, 1955 8 Sheets-Sheet 5

INVENTOR.
MAX. B. KIRKPATRICK
BY
Reynolds, Beach & Christensen
ATTORNEYS

April 11, 1961 M. B. KIRKPATRICK Re. 24,965

MINING MACHINE

Original Filed Aug. 8, 1955 8 Sheets-Sheet 6

INVENTOR.
MAX B. KIRKPATRICK

BY Reynolds, Beach & Christensen
ATTORNEYS

MINING MACHINE

Original Filed Aug. 8, 1955 8 Sheets-Sheet 7

INVENTOR.
MAX. B. KIRKPATRICK
BY
Reynolds, Beach & Christensen
ATTORNEYS.

INVENTOR.
MAX B. KIRKPATRICK
BY
Reynolds, Beach & Christensen
ATTORNEYS

United States Patent Office

Re. 24,965
Reissued Apr. 11, 1961

24,965

MINING MACHINE

Max B. Kirkpatrick, Anchorage, Alaska, assignor to Alkirk, Inc., Seattle, Wash., a corporation of Delaware Original No. 2,864,600, dated Dec. 16, 1958, Ser. No. 527,098, Aug. 8, 1955. Application for reissue Sept. 22, 1960, Ser. No. 57,858

30 Claims. (Cl. 262—7)

Matter enclosed in heavy brackets [ ] appears in the original patent but forms no part of this reissue specification; matter printed in italics indicates the additions made by reissue.

In the mining of material which is found in thick seams, and particularly when the material being mined is a friable material such as coal, it has been found advantageous to employ mining machines which can be likened to moles. These machines, generally cylindrical, burrow forwardly into the seam, the loosened material passing through the machine and out at its rear end, and the machine being advanced, usually, by traction treads bearing against the walls of the bore. Such machines are also useful in many types of underground tunneling. An example of such a machine is to be found in my copending application Serial No. 399,255, filed December 21, 1953, now Patent No. 2,756,037, dated July 24, 1956.

That machine consisted primarily of a large, heavy, lengthy shell, of a diameter (in the preferred form) to house an operator, supporting at its forward end two rotative cutter rings, a greater one of an effective diameter slightly exceeding the outside diameter of the shell, and an inner one of lesser diameter. These cutters were counterrotated simultaneously, for the principle of counterrotation was depended upon to lessen the torque, otherwise applicable to the shell itself, and so in turn to the traction treads. It was found, notwithstanding the weight and consequent inertia of the machine of my prior application, and notwithstanding the simultaneous counterrotation of the two cutter rings, that the cutting effort produced a whipping about an excessive vibration of the machine as a whole, which tended to be destructive. The installation of wall-contacting guides on the shell, close to the greater cutter ring, alleviated this difficulty, yet still the machine was heavy, and had to be supported by traction devices at a distance from the cutters.

According to the present invention no attempt is made to support or to hold the machine steady at points located distant from its cutters, as were the supporting traction devices and other guiding elements in my former machine, nor to absorb its movement by increasing the mass inertia of the machine. Rather, the mass of the machine is reduced as much as is practicable, and the machine is supported wholly, while in use, upon guide devices located as closely as possible behind the greater cutter ring, and capable of being pressed outwardly into contact with the smooth walls of the bore just previously cut or actually machined by that cutter ring, much as the catspaws of a cylinder boring bar expand into contact with the bore wall of the engine cylinder immediately behind the fly cutter, and hold the cutter steady, without chattering. The lesser cutter ring can be projected well ahead of the greater cutter ring, and at such times the machine tends to balance about the outwardly pressed guide devices.

By thus steadying the greater cutter ring close to the larger cutting circle, chattering of the machine as a whole is avoided. Its mass may be slight, since its inertia is no longer depended upon to absorb chattering. The length of the cylindrical elements being short, and its support being located near its center of longitudinal balance, the machine may be directed angularly in traverse or in azimuth, with great facility.

The principle of counterrotation is still retained, to advantage, but with the additional capability of rotating and advancing either cutter ring alone, while holding the other stationary both rotationally and axially by direct engagement with the bore wall, to constitute in a measure a reaction point whence force is applied to rotate and advance such other. This push-drag procedure is used to begin a new bore, after which both cutters may rotate simultaneously in opposite senses, while the machine is being advanced by other means.

By means of the two cutter rings of different diameter the machine as a whole will bore its way into the hole, actually cutting only two narrow annular grooves, and for the most part breaking out in chunks the much greater mass of friable material which is not directly cut out by the cutters, and which intervenes between them, and within the circle of the lesser cutter.

This loosened, friable material falls to the bottom of the bore, and is picked up by buckets which are associated with the rotative greater cutter, and dropped by these buckets into a receiving hopper within the shell, whence they pass out at the open rear end of the hopper to any suitable conveyor, such as follows the advance of the mining machine.

Because the mining machine as a whole is light and the shell is of slight extent axially, as compared to the former machine, and the machine as a whole is supported at a point in its length which is close to its center of balance, it is much more readily maneuverable, particularly to enable change of direction, either in elevation or in azimuth. Guiding wheels are employed which contact the bore behind the machine, and which are adjustable radially, whereby to control and effect such change of direction about the center of support.

The two cutters preferably are driven by and through a common drive means of planetary nature, but specially constructed to afford a differential drive to the cutters of different diameter, by which they can be made to cut at like peripheral speeds, and to enable the drive to one cutter to idle while the other cutter is cutting, and vice versa, or alternatively, to permit both to idle or both to rotate, in the latter case, oppositely to one another. The steadying means for the greater cutter, and somewhat similar means associated with the lesser cutter, can be pressed so firmly against the walls as to anchor each cutter non-rotatively in an attained forward position in the bore, while the other cutter is being rotated and advanced from the anchorage thus afforded. Such anchoring means are separate from but operated in coordination with the alternate driving connections in the transmission.

From the above, it can be seen that the present machine provides a rather compact, lightweight, and, hence, relatively less expensive machine, capable of accomplishing the boring with a very minimum of vibration, and consequent strain on the whole, more efficiently, at lower cost, probably more rapidly, and with greater freedom of maneuver, than in machines of my earlier type.

The invention is shown in the accompanying drawings in a typical form such as is presently preferred by me. This particular form will be described in this specification, and the principles of this invention will be defined, both as related to the illustrated form and to equivalent forms and constructions, in the appended claims.

Figure 4a is a simplified or diagrammatic isometric view, illustrating a portion of the driving or transmission mechanism, with parts all in idling relationship, and Figure 4b is an illustrative diagram showing the relationship of certain drive parts when they are operatively disconnected as shown in Figure 4a.

Figure 5a is a view similar to Figure 4a, and Figure 5b is a diagram similar to Figure 4b, these Figures 5a and 5b illustrating the drive mechanism with parts in a drive relationship such as will effect rotation of the lesser cutter.

Figure 1:
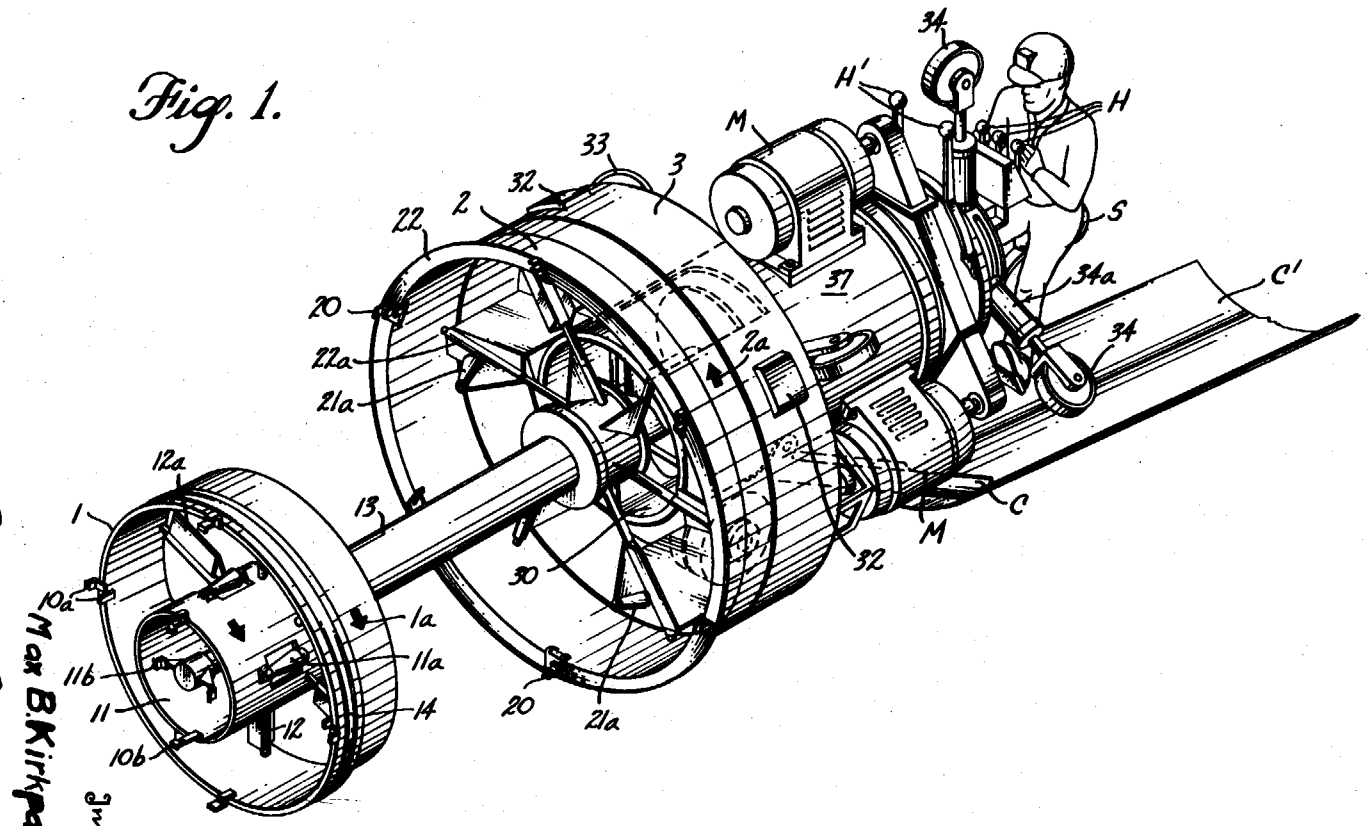
Figure 1 is an illustrative isometric view of the machine, with the lesser cutter projected far ahead of the greater cutter.
Figure 2:
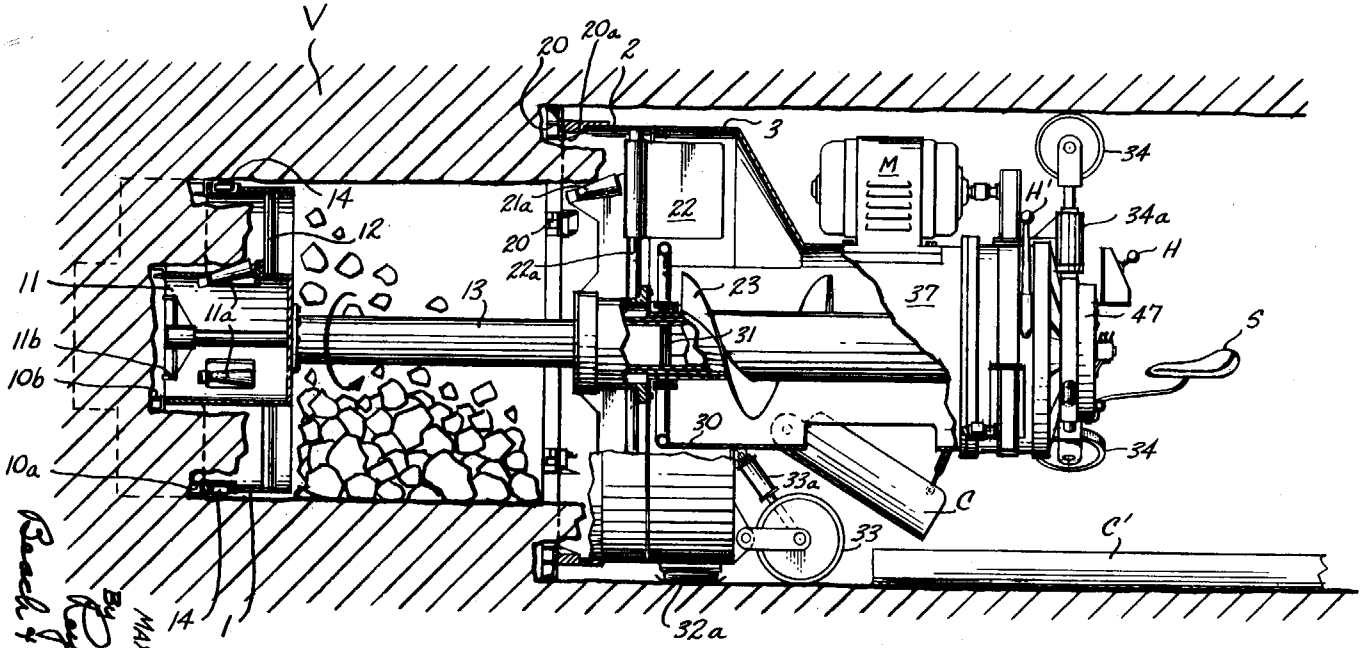
Figure 2 is a side elevational view of the machine, with parts broken away and shown in section, to illustrate certain details of the interior construction thereof.
Figure 3:
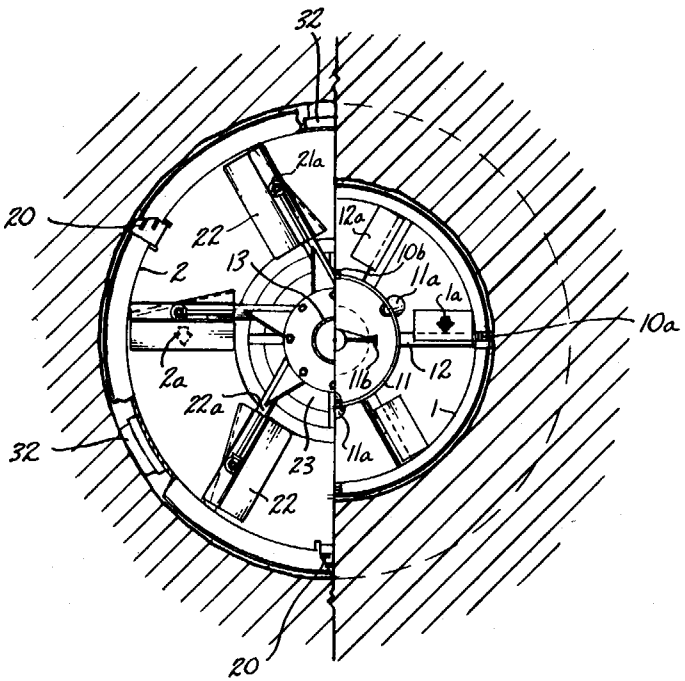
Figure 3 is, in part, an end elevation looking at the lesser cutter, and, in part, a transverse section taken just ahead of the greater cutter, the latter also being broken away in part.

It is believed that the invention will be understood most readily by, first, describing the principal components, and then describing its various capabilities and functions, concluding with a detailed description of the transmission mechanism and of the effect thereof on the operation of the machine.

The lesser cutter ring 1 is a short cylinder, or annulus, having cutter teeth 10a of suitable shape and material spaced at angular intervals about its periphery. In addition, there is an inner pilot annulus or stinger 11, also provided with cutter teeth 10b. These two annuli are connected together, as by spokes 12, for conjoint rotation, and coal-breaking elements 12a, 11a, and 11b are provided intermediate the annuli 1 and 11 and within the latter, to break loose the friable coal left when the cutter teeth 10a and 10b cut narrow annular grooves into the face of the seam or vein.

The greater cutter 2 is of appreciably larger diameter than the lesser cutter ring 1, and is supported from and for rotation with respect to a slightly smaller non-rotative cylindrical shell 3 of rather short axial extent. Like the lesser cutter 1, the greater cutter 2 carries peripherally mounted cutter teeth 20 hingedly mounted at 20a to swing inwardly, and coal breaker elements 21a and 22a. It mounts also buckets 22 which rotate with the ring 2 and serve to lift material which has been broken loose and has fallen to the bottom of the bore, for depositing that material into a hopper 30, supported within the shell 3, so that it may pass out the rear end of the hopper, for discharge onto a suitable chute or conveyor indicated at C. A rotative feed screw 23 secured to the greater cutter 2 for rotation with the latter serves to advance the material rearwardly through the shell 3.

The lesser cutter ring 1 is preferably mounted at one end of a reciprocable and axially movable hollow plunger rod 13, which receives within its opposite end a fixed plunger head or piston 31. The plunger rod 13 is also rotatable, and the means for rotating the same will be described later. It will be understood that the application of pressure fluid at one side or the other of the plunger head 31 will effect projection or retraction of the plunger rod 13 and of the lesser cutter which it carries at its outer end.

Distributed about the shell 3, closely behind the greater cutter ring 2, are several inflatable pads 32, faced with metal shoes as skids. The lowermost pad 32 serves as a support for the machine as a whole. If all such pads 32, 32a are expanded with maximum force radially against the wall of the bore they will grip with sufficient force that the machine can not be displaced axially nor rotationally. While they are so expanded they constitute reaction points whence the rotating lesser cutter 1 may be pushed forwardly, cutting its way ahead of the greater cutter 2, which at such a time would be non-rotative. By expanding the lower pad 32a only sufficiently to support the weight of the machine, and the remaining pads 32 less than is required for gripping, they accomplish the very important functions of steadying and guiding the greater cutter 2, close behind the latter, as the latter rotates and advances. They function similarly to the well-known catspaws of cylinder-boring machines, whether the cutter 2 be rotated alone or conjointly with the cutter 1. It is this close-up guidance that avoids chattering and vibration, and leaves a smooth machined bore.

The lesser cutter 1 also has an inflatable ring 14, close behind its teeth 10a, but this functions primarily as an anchorage means. After the lesser cutter has been projected forwardly, while rotating, cutting a bore to the desired axial extent beyond the non-advancing, non-rotative greater cutter 2, rotation of the cutter 1 ceases and the ring 14 is inflated sufficiently that it grips its bore wall to serve as a reaction point whence the greater cutter 2, now rotative, can be dragged ahead. As the greater cutter advances, it cuts its way into the vein, and enlarges the bore. This push-drag procedure can be repeated, but ordinarily is used only to start a bore, and advance is usually accomplished by effecting simultaneous counterrotation of the cutters 1 and 2, at like peripheral speeds, while advancing the machine axially by traction means 33. Outboard wheels 34 effect guidance only, and are not depended upon to resist vibration.

Wheels 33, controlled by rams 33a, are primarily for traction by means of the motor 33b, either when the machine is not entered within a bore (as in Figure 10), or while it is being advanced within a bore during simultaneous counterrotation, or while it is being backed from a bore. Advance of the machine by the push-drag procedure of first pushing the lesser cutter ahead, then anchoring the latter and dragging ahead the greater cutter is normally employed only when there is inadequate traction for the wheel 33. During operation of the machine according to the push-drag procedure the wheels 33 can be retracted from contact with the bore walls, and the machine is supported wholly upon the lower pad 32a. This serves also as a skid during axial advance of the shell 3 and greater cutter 2.

Assuming the machine to be about to commence a new bore (as in Figure 10), the shell 3 is suitably anchored or backed, and the lesser cutter 1 is pushed ahead by thrusting on the plunger rod 13, while rotating; the greater cutter 2 is held stationary. The cutter 1 cuts its way into the vein V, until it has advanced as far as is practicable. It may advance to the point shown in Figure 10 by dash lines. When the lesser cutter 1 has advanced as far as is practicable the ring 14 is expanded with sufficient force to grip the bore wall, and rotation of the lesser cutter 1 is stopped by disengaging it from its drive, through transmission mechanism still to be described. Through the transmission the greater cutter 2 is rotated. By reaction from the now-anchored lesser cutter 1, through the hollow plunger rod 13, the rotating greater cutter 2 and the shell 3 are dragged ahead. The pads 32 and 32a act as steadying guides close behind the greater cutter 2, and prevent vibration. When advance of the greater cutter has proceeded as far as is practicable, the original status is restored, and the lesser cutter may resume its advance, reacting from the pads 32 and 32a, or the normal mode of operation may commence, in which both cutters 1 and 2 rotate simultaneously but oppositely, advance being effected by the wheel 33 and motor 33b.

The drive for rotating the cutters 1 and 2 is from one or several motors M, which may be electric or hydraulic in character. Electric motors are shown. If there be several such motors, and this is preferred because of the limitations of space, they would be connected by individual or common driving chains 40 to a common drive sprocket wheel 4. This sprocket wheel 4 is mounted by a bearing 4a to rotate about a rotative sleeve 19, which in turn is journaled at 37a and 37b within the forward end and the rear cover 37c of a transmission casing 37 which is fixed with relation to the stationary shell 3. The internal hollow plunger rod 13 is keyed at 13a to slide axially with relation to the rotative sleeve 19, and the latter is, in turn, keyed to a sun gear 18 which is the immediate means for driving the lesser cutter 1. The greater cutter 2 is supported upon the outer end of a rotative sleeve 29, which is keyed at its rear end to the sun gear 28, by which the larger cutter is caused to rotate. The whole is journaled within the transmission casing 37.

It will be noted that the two sun gears 18 and 28 are at opposite faces of the main driving sprocket wheel 4. Associated with the sun gear 18 is a coaxial idler gear 17 slightly larger in diameter than the sun gear 18, and the two are interconnected by integral planet gears 17a and 18a (of which there are several sets distributed angularly about the sprocket wheel 4) rotative above a common stub shaft 41 which is fixed with relation to and rotative with the driving sprocket wheel 4. A similar idler gear 27 coaxial with the sun gear 28, and integral connecting planet gears 27a and 28a on the opposite end of the same stub shaft 41, complete the connection between the gears 28 and 27. The gear 27 in this instance is somewhat smaller than the sun gear 28, and the gears 17 and 27 are of like diameter.

A brake drum 42 is fast to the gear 17 and a brake drum 43 is fast to the gear 27. By application of brake bands 44 and 45 to the respective drums 42 and 43, the rotation of the gear 17 or of the gear 27 can be stopped. Stoppage of gear 17 effects rotation of the complemental driving gear 18, and of the lesser cutter 1, while stoppage of gear 27 effects rotation of the gear 28 and of the greater cutter 2. A third brake drum 47, keyed to an extension 19a of the rotative sleeve 19, can be stopped by application of expanding brake shoes 46, which halts rotation of the lesser cutter 1. The application of these several braking means is under control of an operator such as would ordinarily occupy the seat S at the rear end of the machine, and who has his operating handles H and H' conveniently in front of him.

Before describing the detailed operation of the transmission mechanism thus described in general, it should be noted that the flexible conduit 15, previously mentioned, extends through the plunger means from a connection at 15a to a pressure fluid source, and at its outer end to the distensible or inflatable ring 14 of the lesser cutter 1. The connections at 31a and 31b are for application of fluid under pressure to force the plunger rod 13 inwardly, acting on the annular pressure head 31c, or outwardly, acting on the plunger head 31, in the axial direction. Other pressure fluid connections, not shown, will accomplish the distension and permit retraction of the pads 32 conjointly, and of the pad 32a alone, all of which are on the non-rotative shell 3. Valves and valve handles H to control these are also under control of the operator at his station.

Figure 8:
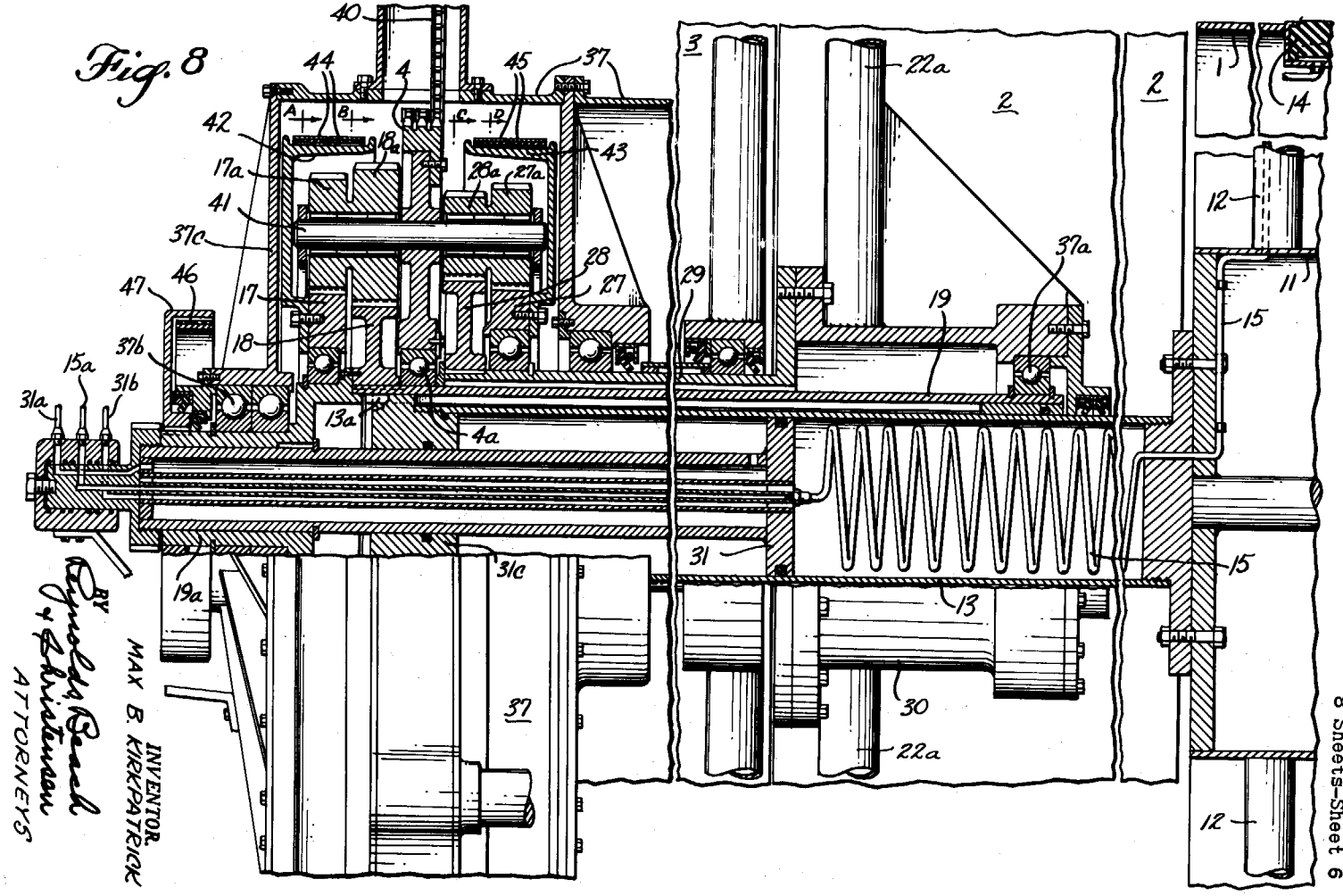
Figure 8 is an axial sectional view through the machine with particular relation to details of the transmission.
Figure 9:
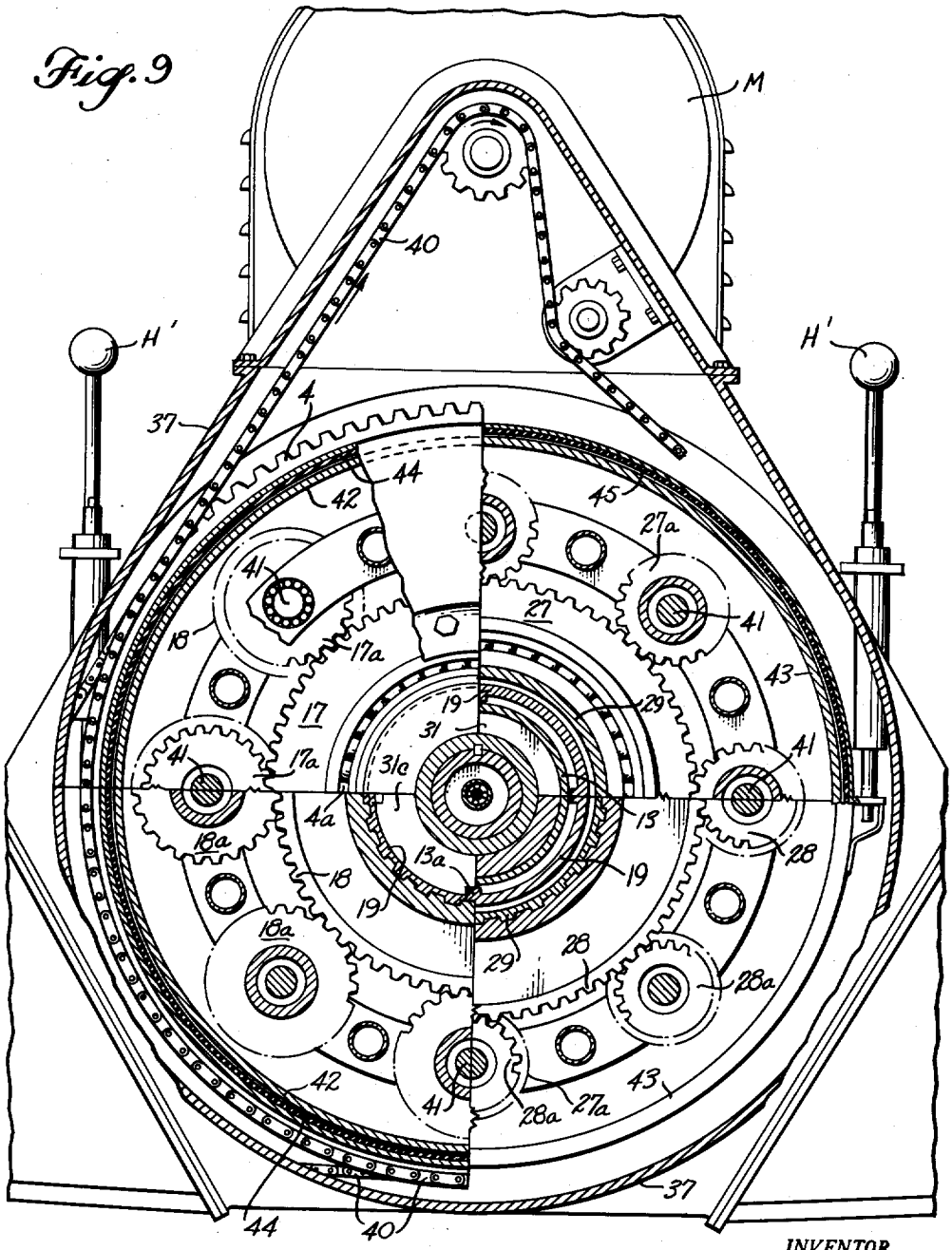
Figure 9 is a transverse sectional view stepped back successively along the lines shown in Figure 8 at A, B, C and D, also illustrating details of the transmission.

It will now be in order to describe in detail the operation, under varying conditions, of the transmission mechanism. For this purpose, reference is made to Figures 4a to 7, inclusive, and to the more detailed views, Figures 8 and 9.

Figure 4a illustrates the mechanism in idling condition. In this and the other similar views the brake shoes 46 are illustrated, for convenience, as brake bands contractible about a drum 47, rather than as expanding shoes.

It will be noted that all three brakes 42, 44; 43, 45 and 46, 47 are released. The main sprocket wheel 4 is rotative, hence, the planet gears 17a 18a and 27a, 28a revolve about the idler 17 and the corresponding sun gear 18, and the idler gear 27 and the corresponding sun gear 28. It being assumed that the cutters 1 and 2 are entered within their respective portions of a bore, the sun gears 18 and 28 are held stationary against the resistance of the material with which they are engaged; this holds the gears 18 and 28 stationary. Through the planet gears, the idler gears 17 and 27, respectively, merely rotate idly, since the corresponding brakes are off. No external movement occurs. It would be feasible, of course, to apply the brake at 46, 47, and no harm would result.

The principle of operation with parts in this operative relationship is illustrated in Figure 4b, wherein the coaxial idler and sun gears 17 and 18 of different diameter are straightened out as though they were racks. If we assume that the sun gear 18 is held against rotation, as it is in fact by the resistance of the working face to rotation of the lesser cutter ring 1, and then roll the planet gears 17a, 18a along these racks through 360° of the gears 17a, 18a, the gear 18a will have advanced a distance along the rack 18 equal to $\pi$ times the pitch diameter of 18a. The gear 17a, being integral with the gear 18a, will have advanced along its rack 17 by an indentical distance. The angular amount along the rack 17 necessary for a 360° rotation of gear 17a is, however, shorter than the distance 18a advances along its rack 18 during 360° of rotation, by the distance (difference) 17c. In order that 17a can keep up with 18a, with which it is integral, the rack 17 must advance through the distance 17c. Since the idler gear 17 is not braked under the assumed conditions (see Figure 4a), this idler gear 17 rotates with respect to its sun gear 18, in accordance with arrow 17b. The idler gear 17 being free of positive connection to the sprocket wheel 4, the lesser cutter 1 does not rotate. The same situation holds true as to the rotation about the gear 28, which is held immovable by the resistance applied externally to the greater cutter 2. Revolution of planet gears 27a, 28a effects rotation of the idler gear 27, but since the brake at 43, 45 is released, the parts merely rotate idly within the transmission, and no external movement is effected.

Figure 5a illustrates the relationship of parts when the lesser cutter 1 alone is rotating. In this view the brake band 44 is applied to the brake drum 42, stopping rotation of the idler gear 17. As the main sprocket wheel 4 continues to rotate the planet gears 17a, 18a and 27a, 28a continue to revolve with the sprocket wheel 4. Since the brake drum 45 is released from the brake drum 43 and the resistance of the greater cutter 2 to rotation holds the gear 28 against rotation, as in the case of Figure 4a, the gear 27 and the brake drum 43 continue to rotate as before, as indicated by the arrow 27b, but since the brake shoe 46 is released from the brake drum 47, the hollow plunger rod 13 and the lesser cutter 1 at its outer end are free to rotate, the brake 42, 44 halts rotation of the idler gear 17, hence, the continued revolution of the planet gears 17a and 18a effects rotation of the sun gear 18 in the sense indicated by the arrow 18b. Since the latter is, in effect, integral with the hollow plunger rod 13, the latter is caused to rotate in the direction indicated by the arrow 13b, effecting rotation of the lesser cutter 1, as at 1a. Again this is understandable by reference to Figure 5b. Rolling the planet gears 17a and 18a through 360° along their racks 17 and 18 respectively, but now with the rack 17 held (by application of the brake at 42, 44) against rotation, obviously the lesser distance of $\pi$ times the diameter of 17a as compared to $\pi$ times the diameter of 18a will evert a thrust on the rack 18, tending to displace it in the direction and by the amount indicated at 18b in Figure 5b. The gear 18 tends to rotate as shown at 18b in Figure 5a, and since the lesser cutter 1 is in effect fast to 18, this lesser cutter is caused to rotate against the reaction of the brake at 42, 44.

By proper application of the correctly elected brake drum and by virtue of the relationship as to size of the idler gear 17 and sun gear 18 and of the connected integral planet gears 17a and 18a, it is seen above that rotation of the single lesser cutter 1, while the greater cutter 2 is stationary, is accomplished, and by expanding the pads 32 tightly during this time and deflating the ring 14 sufficiently that it will steady but not bind, and thrusting axially forward the plunger rod 13, the lesser cutter 1 cuts as it rotates and advances, reacting from the grip afforded by the pads 32 on the exterior of the bore which has been cut by the greater cutter 2.

Figure 6:
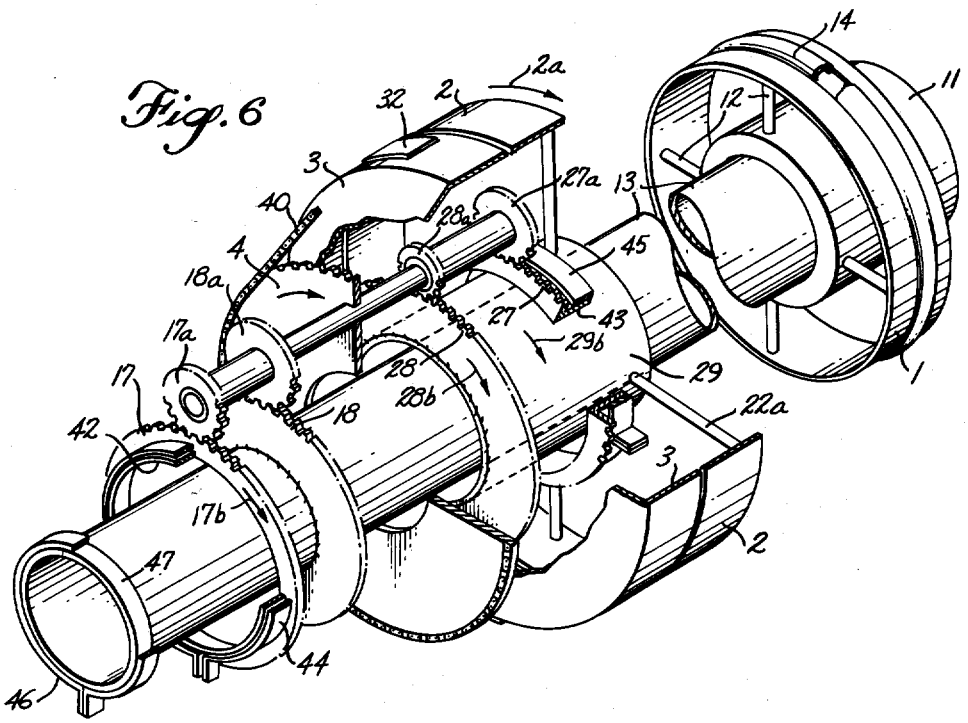
Figure 6 is a view similar to Figures 4a and 5a, showing the parts in a still further driving relationship, such as will effect rotation of the greater cutter.

Coming now to Figure 6, this illustrates the situation wherein the lesser cutter 1 has advanced as far as it is desired to advance it for the time being, and is held stationary by the expansion of the ring 14. The pads 32 have now been deflated sufficiently that they steady but do not bind, and the greater cutter 2 is rotating in the sense indicated by the arrow 2a which, it will be noted by comparison with Figure 5a, is counter to the sense of rotation 1a for the cutter 1 in the latter figure.

To accomplish the rotation 2a in Figure 6, the still-rotating sprocket wheel 4 is connected to the sun gear 28, the brakes 43, 45 and 46, 47 are engaged, as indicated in Figure 6, but the brake 42, 44 is released. Release of the brake 42, 44 enables the gear 17 to rotate idly, reacting from the gear 18, which is held against rotation by the external reaction applied to the lesser cutter 1, but the revolution of the planet gears 27a and 28a effects a reaction from the now-stationary idler gear 27, held by the applied brake 43, 45, to effect rotation of the gear 28 by reaction from the now-stationary gear 27. Rotation of the gear 28 is effected in the rotative sense indicated at 28b in Fig. 6, consequently, the sleeve 29 is rotated in the sense indicated by the arrow 29b, and effects rotation of the greater cutter 2 in the sense indicated by the arrow 2a. A diagram similar to Figures 4b, or 5b could be drawn to indicate how this is accomplished, but the principle has been indicated in the diagrams in Figures 4b and 5b, and it is believed to be unnecessary in connection with Figures 6 and 7.

In Figure 6, then, the lesser cutter 1 having been advanced to the limit of its desired axial advance for the time being, and being held non-rotative by tight expansion of the ring 14, the greater cutter 2 is rotated and meanwhile is being advanced by application of pressure to the proper side of the plunger 31, to effect axial advance of the greater cutter 2 while it is rotating, by reaction from the lesser cutter 1 and its expanded ring 14.

Figure 7:
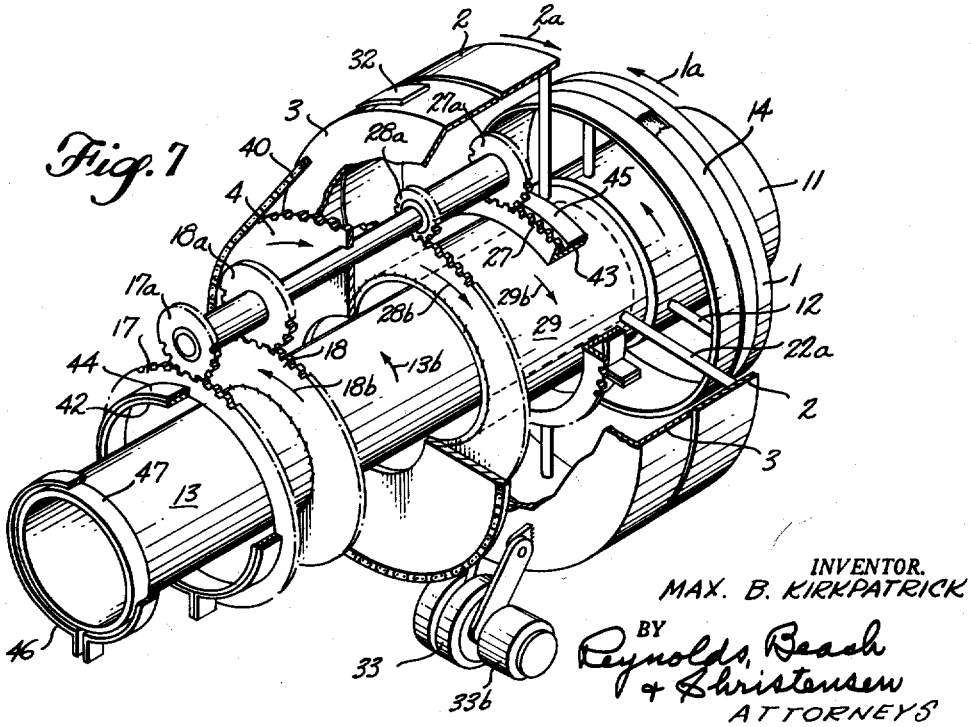
Figure 7 is another similar view, showing parts in a still further driving relationship, such as will effect simultaneous counterrotation of both cutters.

Figure 7 indicates the condition which would apply when both cutters are rotated simultaneously and in rotative senses counter to one another. This is the preferred mode of operation. In this instance, the machine is advanced as a whole by energization of the motor 33b applied to the lower wheel 33, or to the several wheels 33.

The sprocket wheel 4 continues to rotate as before and in the same sense. Brakes 42, 44 and 43, 45 are both applied, but the brake 46, 47 is released. It follows that the idler gears 17 and 27 are fixed with relation to the shell 3, the ring 14 is deflated, the pads 32 are deflated, sufficiently that they do not bind, although they continue to steady the machine, and pad 32a to support it, and both cutters 1 and 2 are free to rotate.

Revolution of the planet gears 17a and 18a effects a reaction from the brake-held, now-stationary idler gear 17 to effect rotation of the coaxial gear 18 in the sense 18b. In similar fashion, revolution of the planet gears 27a and 28a effects a reaction from the brake held, now-stationary idler gear 27 to effect rotation of the gear 28 in the sense indicated by the arrow 28b. The gear 18 is connected to rotate the lesser cutter 1 in the sense indicated at 1a, while rotation of the gear 28 effects rotation of the greater cutter 2 in the sense indicated at 2a, which is counter to the sense 1a.

By proper choice of gear relationships, the rapidity of rotation of the greater cutter 2 in the sense 2a can be somewhat less than the rapidity of rotation of the lesser cutter 1 in the sense 1a, so that, in effect, the torques produced by the two cutters 1 and 2 are counter and generally equal, and the circumferential rate of cutting may be made equal. In this manner, the two cutters 1 and 2 neutralize each other, consequently, there is no need for provision to otherwise neutralize the torque. The machine as a whole is readily advanced along the bore by the motor 33b; meanwhile the cutters cut their way into the bore, the loosened material being deposited within the hopper 30 by means of the buckets 22 and so being removed at the rear end of the hopper 30 by means of the chute C or other convenient means.

Figure 10:
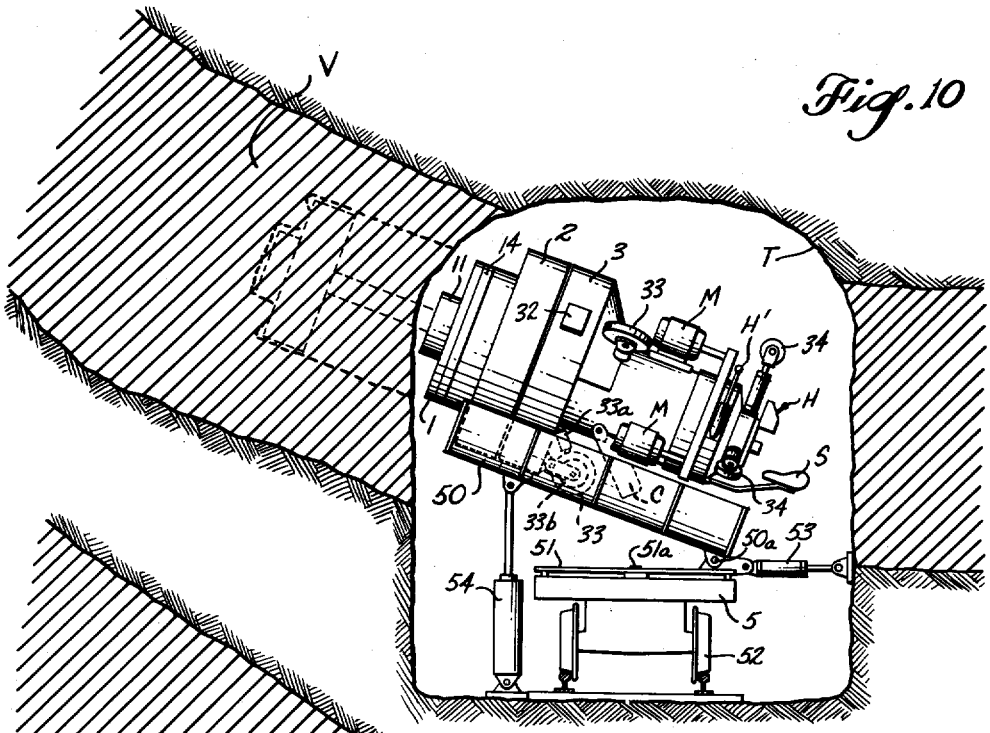
Figure 10 is a sectional view through a mine tunnel intersecting a vein, and showing the manner of initiating a bore into the vein with the machine; cutter teeth have been omitted.
Figure 11:
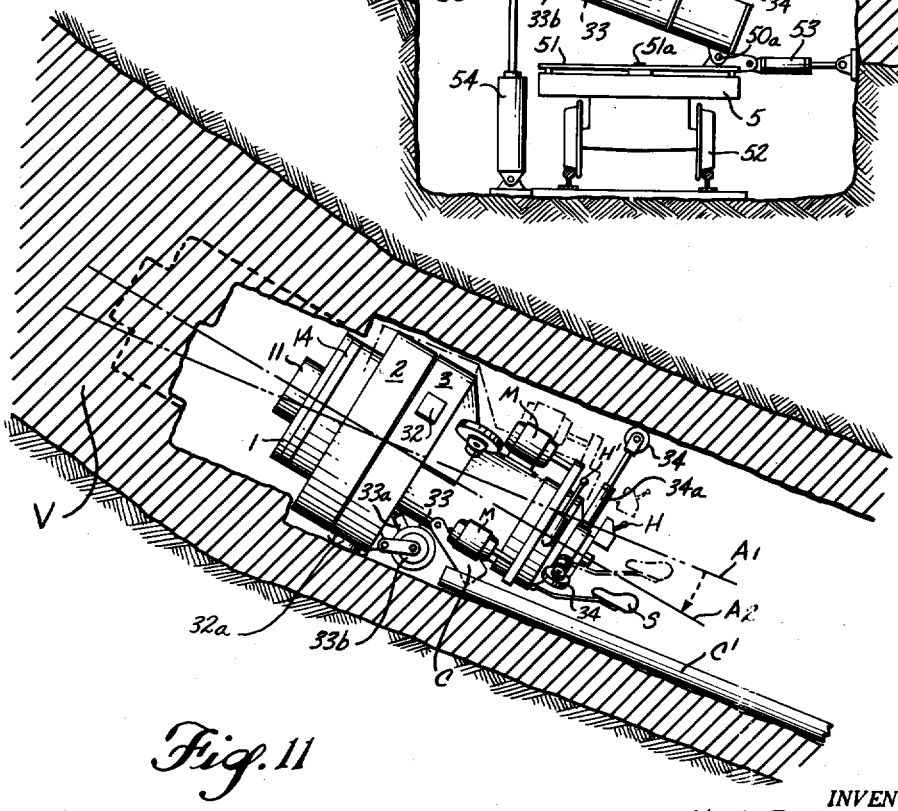
Figure 11 is a view similar to Figure 10, illustrating how the machine of this invention may be maneuvered in order to change direction upon encountering a bend in the vein; here also the cutter teeth have been omitted.

Figures 10 and 11 illustrate various situations encountered in the use of such a machine. In Figure 10, the machine has all its parts retracted and it is supported upon a curved channel 50, supported in turn from a turnable 51, the axis whereof is at 51a, upon a car 5 mounted upon wheels 52 by means of which it may be carried through a tunnel T into the interior of a mine. A backing ram 53 may support the turntable from the wall of the tunnel and a ram 54 may elevate the channel 50 from the tunnel floor to any desired angle, so that the cutters 1 and 2 may begin their advance into the vein V in the manner indicated, for instance in dash lines, in Figure 10. The initiation of a bore would normally be by first advancing the lesser cutter 1 and then the greater cutter 2.

After the machine has advanced into the vein, should it be found that the vein curves or bends from the axis A1 of Figure 11 to the axis A2, it is a simple matter with the short-length shell of the present invention to withdraw the leading lesser cutter 1, and with the machine retracted to the full, and resting upon the single pad 32a, by proper manipulation of the rams 34a of the several steadying wheels 34, the machine may be tilted as a whole about its center of balance, represented by the pad 32a, and so the machine may be started in a new direction along the axis A2 from the new position shown in full lines in Figure 11, and as indicated by the dash-line position of the prospective bore in that figure.

Where the vein is steeply sloping, as it is in certain Alaskan coal mines, it will be found very convenient to employ a chute C′ which may rest upon the bottom of the bore and which will follow the chute C. Coal discharged from the chute C upon the forward end of the chute C′ will slide down the latter to a convenient collecting point. If the bore is not sufficiently steeply sloped, then any convenient conveyor means may be provided for removal of the coal from the foot of the chute C to a collecting point.

By means of a mining machine of the character indicated, in mines of the nature also indicated, and such as are found in Alaska, and elsewhere, the mining operation may be accomplished by cutting a series of overlapping bores, leaving at proper intervals uncut supporting walls, and it has been found that by so operating a larger proportion of the available seam can be recovered, yet with adequate safety, than by prior known methods, and the recovery is accomplished rapidly and at low cost, for such a machine as this will advance itself at a rate of several feet a minute. The cutters are required to cut only a narrow groove, and the intervening material is broken loose in chunks by the coal breakers 11a, 21a, 12 and 22a.

Whenever it is necessary to back out of a bore, this can be done by reversing the traction motor 33b, or by otherwise applying an axially directed force to the shell 3. The hingedly mounted teeth 20 will collapse inwardly, by positive or automatic action, and so will lessen the resistance of the machine as a whole. It is unnecessary to collapse the teeth 10a and 10b, for these are almost immediately withdrawn from the smaller portion of the bore, although they could be similarly hingedly mounted if there were any need for so doing.

The power requirements for this machine are relatively small, since the cutters are balanced one against the other, and but little effort is required to advance the machine as a whole. The cutters require power only to cut a narrow groove, while most of the material is dislodged by breaking it away between the grooves, and within the inner groove, so that the power required is not so much a steady grind as an occasional surge.

I claim as my invention:

1. A mining machine comprising two coaxial annular cutters, of greater and lesser diameters, respectively, a non-rotative shell supporting both thereof for rotation, means for rotating said cutters in opposite rotative senses, means supported upon the shell closely behind the greater cutter, and projectable outwardly into contact with the bore wall, and slidable therealong when so projected to steady said greater cutter as it rotates, means separate from said steadying means to advance the machine axially, and further means distant from the steadying means and engageable with the bore wall to tilt the axis of the shell in a desired direction.

2. A mining machine as in claim 1, wherein the steadying means for the greater cutter is mounted upon the shell in the vicinity of the machine's longitudinal center of balance.

3. A mining machine as in claim 2, including a shell-supporting element located at the shell's lowest point, and constituting a part of the shell-mounted steadying means.

4. A mining machine as in claim 1, wherein the steadying means include inflatable elements mounted for projection outwardly into contact with the bore walls by their inflation.

5. A mining machine comprising two coaxial annular cutters, of greater and lesser diameter, respectively, a non-rotative shell supporting both thereof for rotation, said shell having an enlarged portion of nearly the effective diameter of the greater cutter, located immediately behind that cutter, but of slight axial extent, means for rotating said cutters in opposite rotative senses at like peripheral speeds, inflatable elements distributed about the exterior of the enlarged portion of the shell for extension into steadying engagement with the bore wall, traction means separate from said steadying means, carried by the enlarged portion of the shell and engageable with the bore wall to advance the machine axially along the bore and tilting means carried by the shell distant from its enlarged portion, engageable with the bore wall and movable radially with respect to the shell, to tilt the machine's axis.

6. A mining machine comprising two coaxial ring-like cutters, of greater and lesser diameters, respectively, plunger means supporting the lesser cutter for axial movement relative to the greater cutter, and vice versa, means operatively associated with each cutter for anchoring the latter, selectively, in an attained position within its bore, and means for rotating each such cutter, at will, to extend its bore, reacting from the other such cutter.

7. A mining machine comprising two coaxial ring-like cutters, of greater and lesser diameters, respectively, means to rotate each such cutter, in the sense opposite to the sense of rotation of the other, and means to advance each cutter axially, independently of advance of the other cutter, to extend the bore.

8. A mining machine as in claim 7, and breaker means carried by the respective cutters, directed transversely of and extending to opposite sides of the rotative path of the lesser cutter, to engage and break off material within the annular grooves cut by both such cutters.

9. A mining machine comprising two coaxial ring-like cutters, of greater and lesser diameters, respectively, a non-rotative shell, means journaling the two cutters for rotation with respect to said shell, means reacting from said shell for projecting the lesser cutter axially ahead of the greater cutter, and conversely for dragging the greater cutter, and the shell, axially forwardly towards the lesser cutter in the latter's advanced position, means carried by the shell to effect rotation of each cutter during its advance, and means operable at will to anchor each cutter in an attained forward position.

10. A mining machine as in claim 9, wherein the anchoring means comprises distensible and collapsible elements mounted on the lesser cutter and on the shell, respectively, and means for selectively distending the element upon the shell, to anchor the greater cutter, or the element upon the lesser cutter to anchor the latter.

11. A mining machine comprising two coaxial annular cutters, of greater and lesser diameters, respectively, a non-rotative shell wherein the cutters are journaled, a power source, planetary transmission mechanism intermediate the power source and the respective cutters, including brake means applicable to halt selectively rotation of the greater or of the lesser cutter, or to effect rotation of both thereof in opposite rotative senses.

12. A mining machine comprising two coaxial ring-like cutters, of greater and lesser diameters, respectively, a non-rotative shell, means journaling the two cutters for rotation with respect to said shell, a power source, transmission mechanism carried by the shell and connecting the power source to each cutter to rotate the latter, means reacting from said shell for projecting the lesser cutter axially ahead of the greater cutter and conversely for drawing the greater cutter, and the shell, forwardly towards the lesser cutter in the latter's advanced position, and means operable at will to anchor each cutter in an attained forward position.

13. A mining machine as in claim 12, including brake means in the transmission mechanism applicable selectively to halt or to permit rotation of each cutter.

14. A mining machine as in claim 11, wherein the transmission mechanism includes a sun gear and a coaxial idler gear operatively connected to each cutter, integral planet gears meshed with and operatively connecting all said sun gears and idler gears, a common drive wheel coaxial with the sun and idler gears, and mounting the planet gears, and wherein the brake means are selectively engageable to halt rotation of either sun gear, thereby to effect rotation of the corresponding idler gear and the associated cutter.

15. A mining machine as in claim 14, including an additional brake means applicable to the lesser cutter to halt rotation of the latter during rotation and axial advance of the greater cutter, but upon relase of said additional brake means and application of the other brake means to halt rotation of both sun gears permitting conjoint rotation of both cutters.

16. A mining machine as in claim 14, wherein the two idler gears are of like diameter, and the lesser cutter's sun gear is of greater diameter than its idler gear, and the greater cutter's sun gear is of lesser diameter than its idler gear, whereby the two cutters rotate in opposite sense.

17. A mining machine comprising two coaxial annular ring-like cutters of greater and lesser diameters, respectively, a cylindrical shell of a diameter corresponding to that of the greater cutter, whereon the latter is coaxially and rotatively mounted, plunger means intermediate said shell and said lesser cutter to maintain all such parts coaxial, but operable to separate or to effect approach, axially, of the lesser cutter and the shell, means to rotate each of the greater and the lesser cutters, and means to anchor, selectively, the shell or the lesser cutter, as an anchorage for exerting axial force on the unanchored such element, during rotation of the other cutter.

18. A mining machine as in claim 17, including rotative drive means common to the two cutters, and means to restrain, selectively, rotation of the cutter which is associated with the anchored element, during rotation and axial advance of the unachored element and its cutter.

19. A mining machine as in claim 17, including a material-receiving hopper within the shell, which is open at its forward end adjacent the greater cutter, and at its rear end for discharge of material, and buckets carried by and rotative with the greater cutter, for lifting material loosened by both cutters, and delivering the same to the forward end of said receiving hopper.

20. A mining machine comprising two coaxial ring-like cutters, of greater and lesser diameters, respectively, a ring-like shell of a diameter corresponding to that of the greater cutter, journal means supporting each cutter from the shell of rotation, drive means carried by the shell for rotating the respective cutters, main supporting means carried by the shell in the vicinity of the machine's longitudinal center of balance, for engagement with the bore wall, guiding supports also carried by the shell, axially distant from said main supporting means and means to effect adjustment of the guiding supports in the radial direction, to guide the machine in the axial direction.

21. A mining machine comprising a shell, a pair of telescopingly connected tubular members of which the outer member is journaled in the shell for rotation, and the inner member is keyed to the outer member for conjoint rotation, and for relative axial movement, a greater ring-like cutter journaled in the shell for rotation, a lesser ring-like cutter carried by an end of the inner tubular member for rotation by the latter and for axial movement with the same relative to the greater cutter, means carried by the shell for rotating each cutter, means for producing an axially directed force between the cutters, and means for anchoring either cutter, selectively, in its advanced position, as a reaction point for advance of the other cutter under the influence of such axially directed force.

22. A mining machine comprising two coaxial annular cutters, of greater and lesser diameters, respectively, a non-rotative shell supporting said greater diameter cutter for rotation, means supporting the lesser diameter cutter for rotation, said shell being of slightly smaller diameter than and located rearwardly of its associated cutter, means for rotating said cutters independently or conjointly, at will, in opposite rotative senses at like peripheral speeds, means carried by said shell and the greater diameter cutter and radially extensible into anchoring engagement with the bore wall, and contractible from such engagement, means reacting between the two cutters for advancing either cutter axially while the other cutter is anchored by its extensible means, and traction means engageable with the bore wall for advancing the machine as a whole during conjoint counterrotation of the cutters.

23. Earth or like boring apparatus comprising a mobile support, a first bore forming assembly on said support shiftable relative to said support, a second bore forming assembly on and shiftable with said support means on the support for selectively actuating said bore forming assemblies to form respective bores, means for releasably anchoring the support to the wall of a bore, means for shifting said first bore forming assembly from the support while maintaining it actuated for forming an advance bore of desired axial extent, means for releasably anchoring the extended first bore forming assembly within said advance bore, and means reacting from said anchored first bore forming assembly for drawing said support and second bore forming assembly essentially in the same direction as said advance bore, said second bore forming assembly being actuated during advance thereof to form a second bore related to said advance bore.

24. The earth or like boring apparatus defined in claim 23, wherein said means for extending the first bore forming assembly and said means for drawing the support and second bore forming assembly comprises a single reversible motor unit.

25. Earth boring apparatus comprising a mobile support, a power driven bore forming assembly on said support, a power driven rotary cutter assembly on said support substantially coaxial with said bore forming assembly, power means on the support for selectively driving said assemblies, means for releasably anchoring the support to the wall of a bore, means for extending said bore forming assembly from the support while maintaining it effective for forming an advance bore of desired axial extent, means for anchoring said extended bore forming assembly within said advance bore, and means reacting from said anchored bore forming assembly for drawing said support and cutter assembly in a direction parallel to said advance bore, said second cutter being driven during advance thereof to cut a further bore.

26. The earth or like boring apparatus defined in claim 25, wherein said means for extending the bore forming assembly and said means for drawing the support and cutter assembly comprising a single reversible motor unit.

27. The earth or like boring apparatus defined in claim 25, wherein said cutter assembly is of such size as to cut a further bore along which said support may be advanced and there anchored for again extending said bore forming assembly.

28. Earth or like boring apparatus comprising a mobile support, a bore forming assembly on said support and longitudinally extensible from said support, at least one large cutter assembly mounted on said support, said cutter assembly being substantially coaxial with said bore forming assembly, means for selectively actuating said bore forming assembly and said cutter assembly to form respective bores, means for extending said bore forming assembly from the support while maintaining it actuated for forming an advance bore of desired axial extent, means for maintaining said support against movement while said advance bore is being formed, selectively operated expansible means for gripping the advance bore and thereby releasably anchoring the extended bore forming assembly within said advance bore, and means reacting from said anchored bore forming assembly for drawing said cutter assembly essentially in the same direction as said advance bore, said cutter assembly being actuated during advance thereof to form a main bore related to said advance bore.

*29. Earth or like boring apparatus comprising a mobile support, a power driven bore forming assembly mounted on said support and comprising essentially a relatively large cutter assembly rotatable about an axis, means on the support for rotating said cutter assembly, a member coaxial with said cutter assembly and reciprocably mounted with respect to said support for projection forwardly of said rotary cutter assembly into a smaller advance bore formed ahead of said rotary cutter, means on said member selectively expansible to anchor the projected member in said smaller bore, and means reacting from said anchored projection member in the smaller bore for drawing said cutter assembly essentially in the same direction as said advance bore, said rotary cutter being driven during such advance thereof to cut a main bore substantially centered with said advance bore.*

*30. In the apparatus defined in claim 29, said expansible means on said member comprising an annular sleeve*

*that is deformable and radially expansible into gripping engagement with the advance bore wall.*

References Cited in the file of this patent or the original patent

UNITED STATES PATENTS

| | | |
|---|---|---|
| 197,456 | Cargill | Nov. 27, 1877 |
| 1,511,957 | Freda | Oct. 14, 1927 |
| 1,888,085 | Humbel | Nov. 15, 1932 |
| 2,170,660 | Langmyhr | Aug. 22, 1939 |
| 2,404,605 | Thompson | July 23, 1946 |
| 2,700,311 | Bade | Jan. 25, 1955 |
| 2,715,526 | Letts | Aug. 16, 1955 |
| 2,756,037 | Kirkpatrick | July 24, 1956 |

FOREIGN PATENTS

| | | |
|---|---|---|
| 518,262 | Great Britain | Feb. 22, 1940 |